Dec. 25, 1945.  C. B. DE VLIEG  2,391,398
HORIZONTAL BORING MACHINE
Filed Sept. 29, 1942  5 Sheets-Sheet 1

Inventor:
Charles B. De Vlieg
By
McCanna, Winterim & Morsbach
Attys.

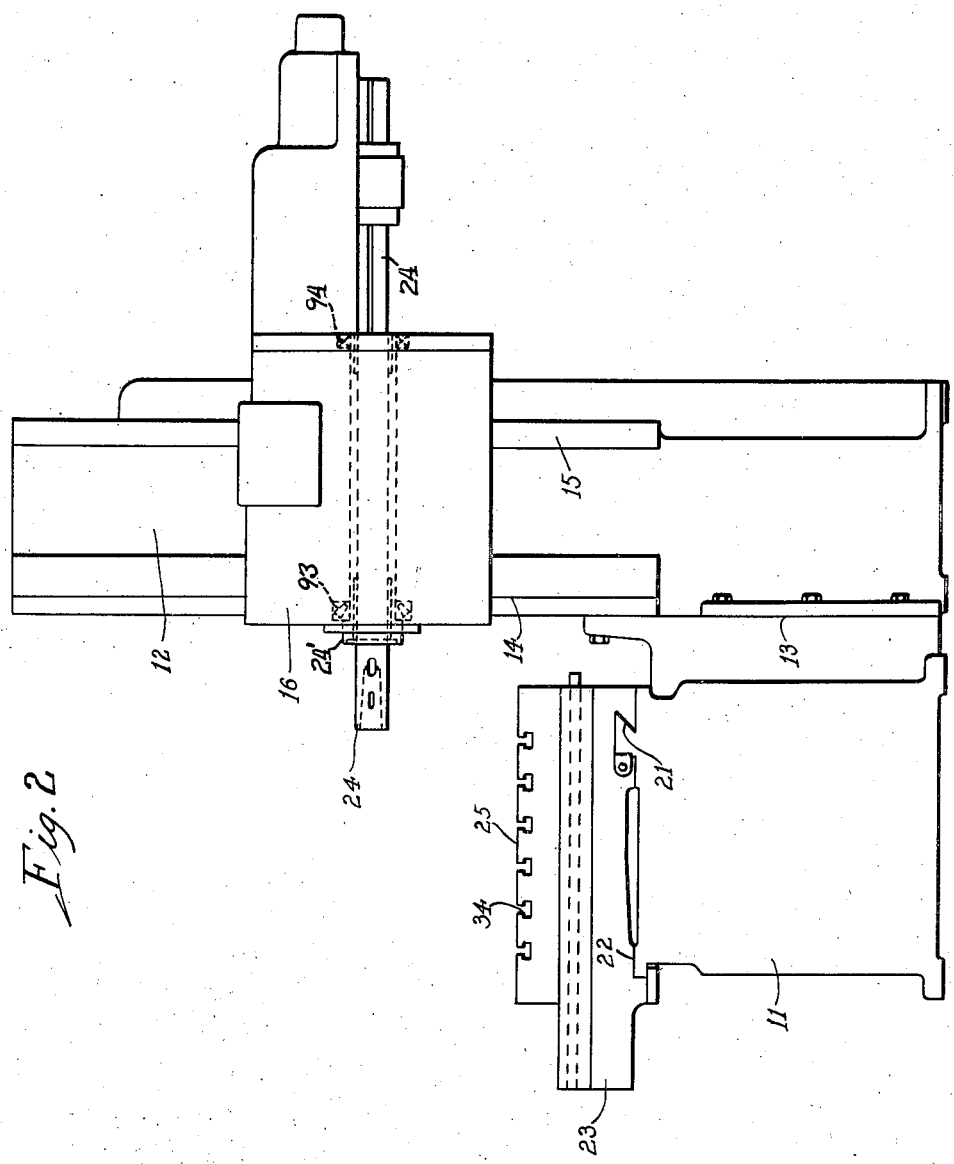

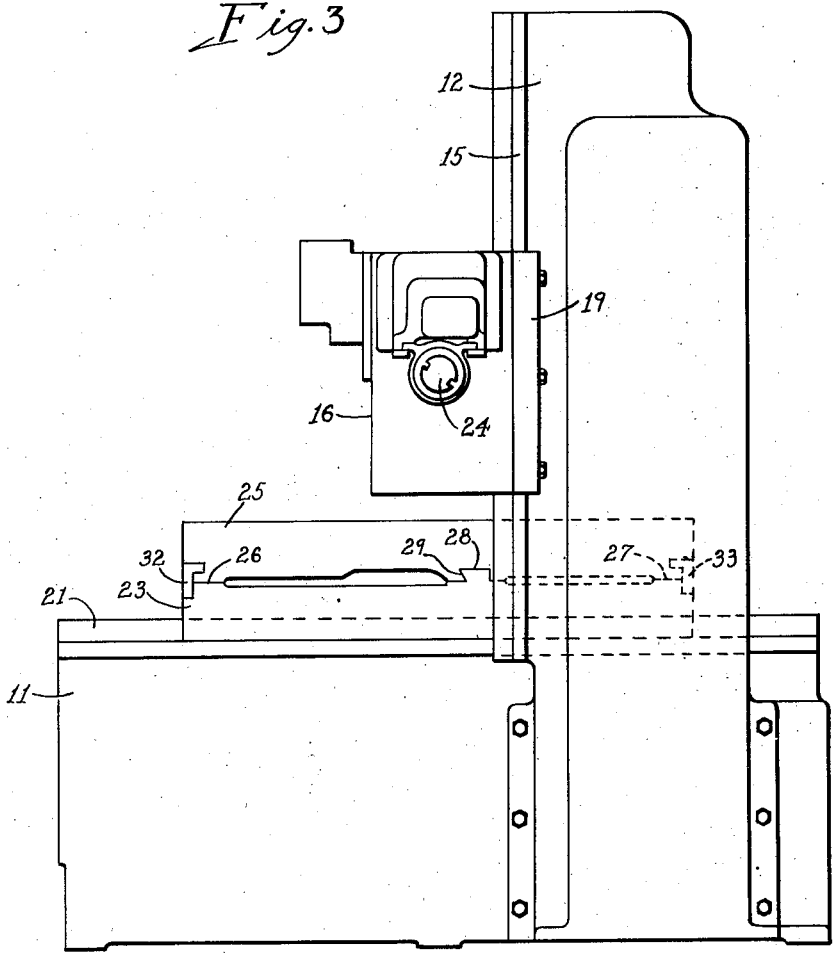

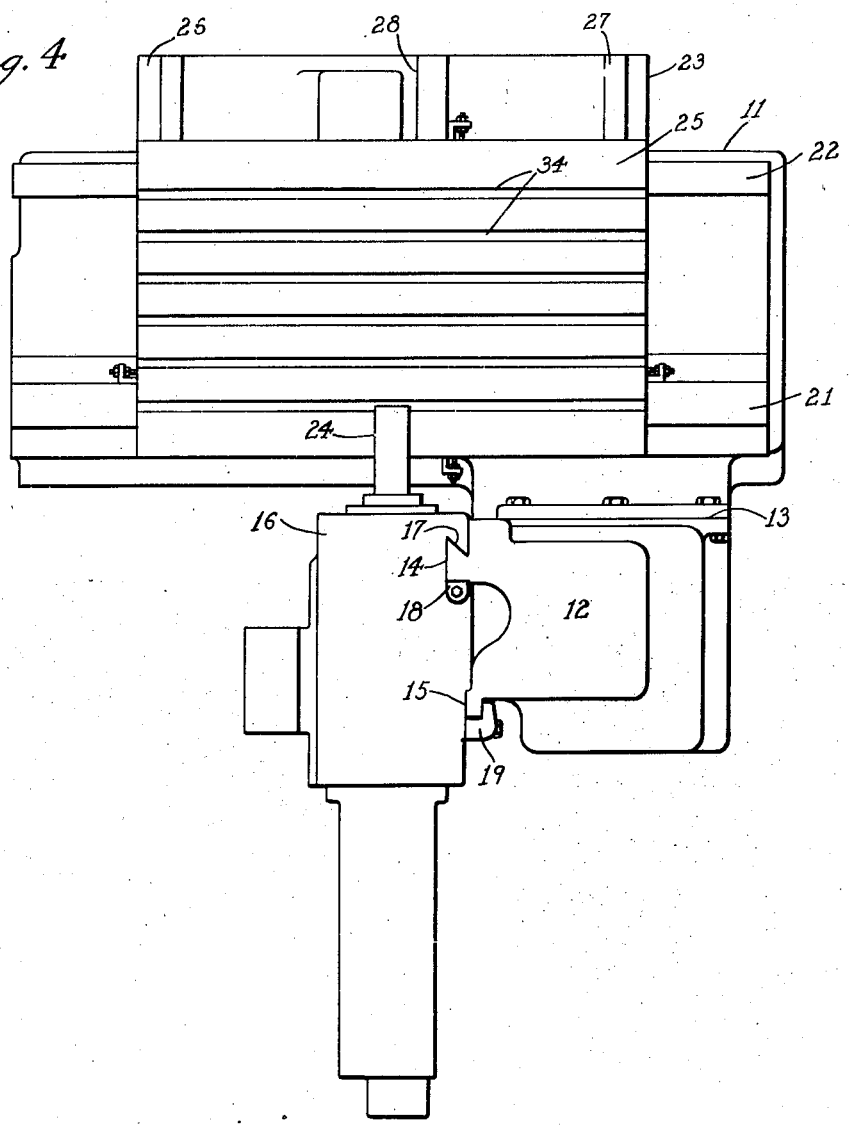

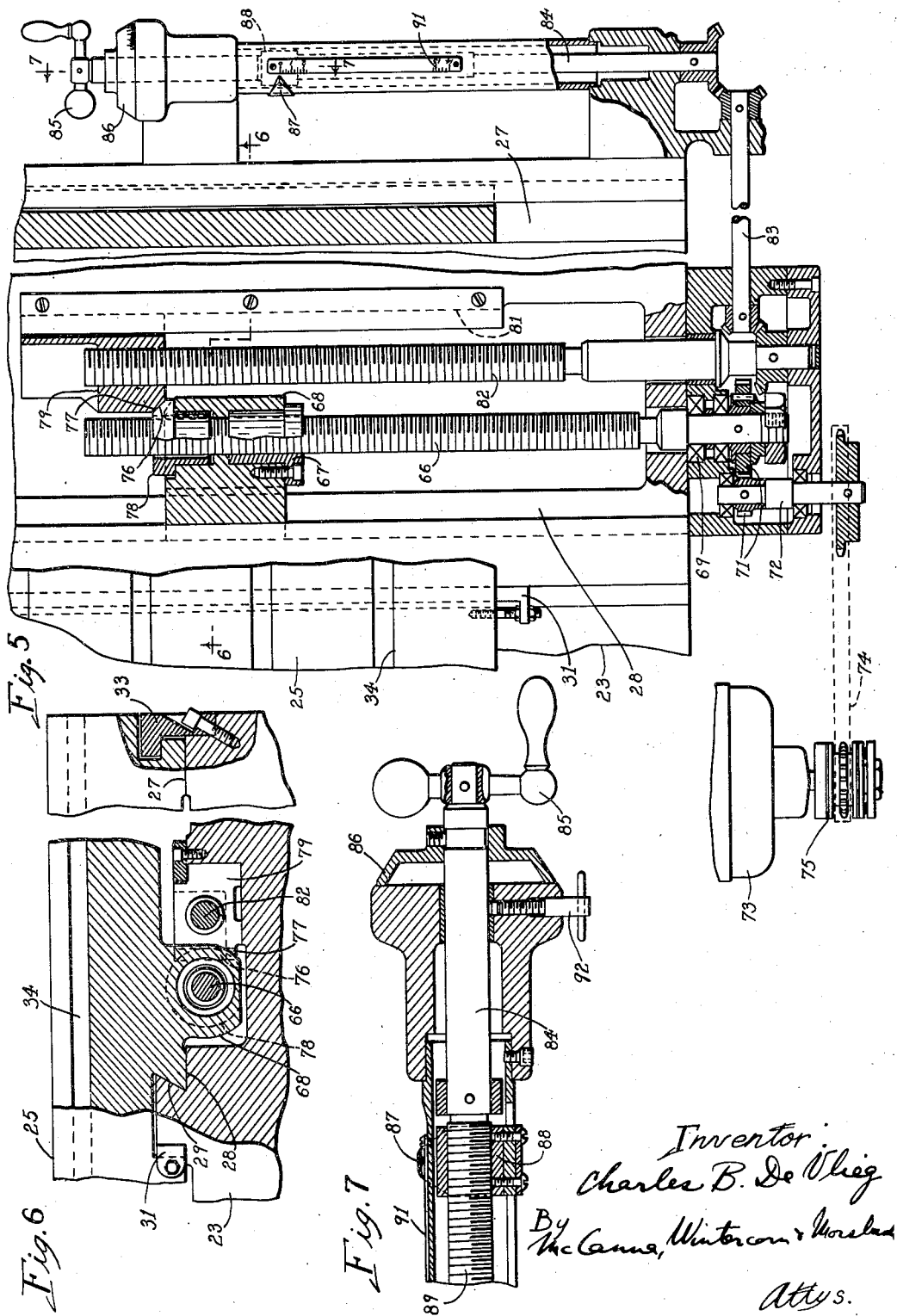

Patented Dec. 25, 1945

2,391,398

UNITED STATES PATENT OFFICE 2,391,398

HORIZONTAL BORING MACHINE

Charles B. De Vlieg, Detroit, Mich.

Application September 29, 1942, Serial No. 460,111

19 Claims. (Cl. 77—3)

This invention relates to horizontal boring machines of the type adapted for boring, drilling, and milling operations in metal.

The primary object of the present invention is to provide an improved horizontal boring machine characterized by a new organization of parts making for a greater degree of precision and accuracy in the work performed and serving to expedite the many operations required in the every day use of a machine of this kind. In other words, the invention enables the user to more accurately do the work within a contemplated range and in less time than with horizontal boring machines of prior design.

My invention contemplates a horizontal boring machine especially designed for a range of jig and fixture work in which the utmost precision is desired because of the inherent nature of such work. It contemplates a machine of this kind which will perform a great variety of milling, boring, and drilling operations within a limited range of work embracing practically all ordinary needs and excepting only a small percentage of large and unusual work pieces. It contemplates a new operator convenience in measuring his work and changing his tools in a way to promote precision and to save time.

One phase of the invention is the provision of a horizontal bed and a vertical column in fixed, substantially integral relationship, without relative adjustment, giving a definite basic rigidity for support of the work and the cutter. In this connection an arrangement of ways is provided by which the forces of all the cutting actions tend to seat themselves into the V of dovetail ways applied both to the bed and the column, thereby promoting the basic fixed relation contemplated by my invention.

Another phase is in the provision of a work table or platen mounted to slide crosswise of the bed and in a plane parallel with the cutter spindle and having power traverse for quickly approaching the work to the cutter and moving it away in response to push button control by the operator in the control position in front of the column. The platen is mounted on a saddle which in turn is reciprocable on the main ways of the bed and is adapted to be moved thereon in the usual feeds and speeds in performance of milling operations. The new arrangement gives the desired rigidity in support of the platen in all working positions and without overhang of the saddle or the platen incidental to prior designs. In the boring operations the feed is only by spindle movement and the work platen is locked rigidly in position and is moved on its cross ways only for positioning, by the power traverse means.

Another phase of the invention is the provision in a boring machine of the character described, of selective positioning means adapted to be set by the operator for predetermined precision location of the work platen and operating in response to a push button control to rapidly traverse the platen to the selected position and automatically lock it in such position and repeat continuously such positioning and locking of the platen to an accuracy of within one ten-thousandth of an inch. This enables the operator to repeatedly reposition the platen in the cutting position in the course of taking successive measurements of his work or in the course of repositioning the platen to avoid obstacles where successive cutting operations are to be taken in an identical plane, and for the miscellaneous needs when changing tools and work pieces. This precision locking combined with rigidity of support of the work piece and accuracy in the fixed relative relation between the work support and the tool support, gives new results in performance and utility of machines of this kind which are distinctly beneficial in this art.

Another object of my invention is to provide an improved positioning and locking mechanism for application to machine tools.

Other objects and attendant advantages will be appreciated by those skilled in this art as the invention becomes better understood by reference to the following description when considered in connection with the accompanying drawings, in which—

Figs. 2 and 3 are front and side elevational views, respectively, of said machine with the drive mechanisms and the controls removed, and showing in outline form the relationship of basic parts of my invention;

Fig. 4 is a top plan view of the parts shown in Figs. 2 and 3;

Figure 1:
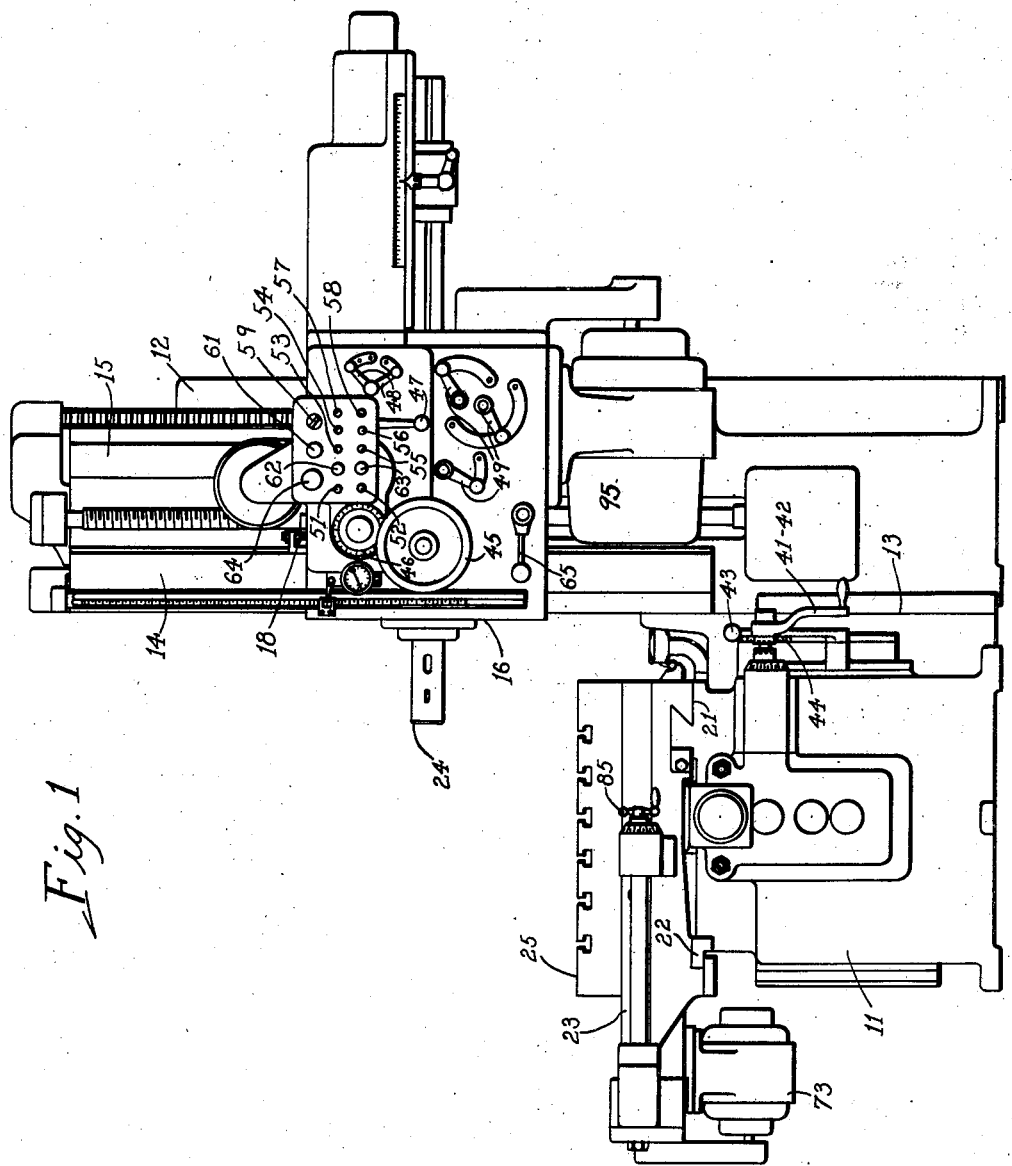
Figure 1 is a front elevational view of a horizontal boring machine embodying my invention.

Fig. 5 is a somewhat diagrammatic plan view of the selective positioning means, above mentioned; and Figs. 6 and 7 are vertical sections taken substantially on the section lines 6—6 and 7—7, respectively, of Fig. 5.

Referring more particularly to Figs. 2, 3, and 4, it will be observed that I have provided a horizontal bed and a vertical column designated generally by reference numerals 11 and 12, of relatively heavy, massive structure constituting in effect a rigid, integral structure. The bed and column may be made in one part but for convenience in manufacture they are made separately and rigidly bolted together at the meeting face 13 which preferably extends above the top of the bed, as shown in Fig. 2. The column is provided with vertical ways integral therewith, designated by 14 and 15 extending from beneath the bed top to the upper end of the column, on which ways a spindle saddle 16 is mounted for vertical reciprocation thereon. The ways shown are particularly designed for the function of this invention, it being noted that the ways 14 have a V-shape 17 at the side nearest the bed, that the opposite ways 15 are in right angle relation at the side farthest from the bed, that the ways 14 are located forwardly of the front of the ways 15, that the saddle 16 has an integral V portion which seats into the V part of the column ways, and that adjustable gibs 18 and 19 hold the saddle firmly but slidably on its ways. The bed 11 is provided with ways 21 and 22 extending the entire length of the bed and being similar in construction and function with the described ways on the column. A saddle designated generally by 23 is mounted for lengthwise reciprocation on the bed ways 21 and 22 similar to the mounting of the spindle saddle on the column, the V of the ways 21 being located at the side facing the column. The saddle 23 is provided at its top with horizontal ways extending crosswise of the length of the bed and parallel with the cutter spindle 24 which is mounted in the saddle 16. A work table or platen 25 is mounted on the bed saddle ways for reciprocation lengthwise thereon and for positioning thereon in a manner to be presently described. The ways on the top of this saddle comprise flat ways 26 and 27 each located adjacent to one end of the saddle and intermediate ways 28 having a V-shaped side 29 in which is fitted the correspondingly shaped way portion integral with the platen 25. An adjustable gib 31 on the platen engages the opposite end of the saddle ways 28 and L-shaped gibs 32 and 33 fastened to the bed saddle engage the correspondingly shaped ways on the platen to retain it in working relation on the saddle. The top of the platen may be provided with T grooves 34 preferably extending lengthwise of the platen, for attachment of the work to the face of the platen. It will be observed from Fig. 2 that the horizontal bed as well as the work platen are arranged relatively close to the spindle column so that a substantial range of work may be supported in close relation to the spindle saddle and consequently to the cutter carried by the spindle; and viewing Figs. 3 and 4 it will be observed that the length of the work platen is coincident with the length of its supporting saddle, and that the length of this saddle is approximately one-third less than the length of the horizontal bed. The platen and its saddle are, therefore, of substantial length in comparison with the horizontal bed. This construction and the general proportions are designed to contribute to the basic rigidity and accuracy in the relationship between the work and the structure, particularly in a range of work such as will avoid undesirable overhang of the platen with respect to the saddle, the saddle with respect to the bed, and the cutter with respect to the work. These relative proportions are noted because while they are important and preferable in the practical functioning of my invention they may be varied in the performance of certain of the novel combinations herein disclosed.

It will now be observed that my invention is particularly beneficial in a horizontal boring machine of this kind in which the cross travel of the platen is employed only for rapid traverse or traverse purposes as distinguished from feed purposes, and the cutting feed is accomplished by the lengthwise travel of the cutter spindle. Thus, the operator, standing in front of the spindle saddle, that is, in front of the controls shown in Fig. 1, may with facility and in response to push button control, or suitable hand control, cause the work platen to be quickly withdrawn to a remote position from the cutter to permit of taking measurements of the cut as a basis for repositioning the work or the cutter, and for many other purposes familiar to those skilled in this art, and to cause by push button control the platen to be power traversed to a predetermined selected position and to be automatically and rigidly locked in such preselected position to an extremely high degree of accuracy. Since in this type of machine a relatively large proportion of the work may be performed by a power driven spindle having power feed lengthwise or vertically as by travel of the spindle saddle on the column, the advantages of this platen mounting and of its power traverse will be appreciated.

My invention is utilized in a machine having conventional or desired power means for imparting lengthwise movement to the bed saddle at different speeds and feeds, as by means of a screw and nut drive, used mainly for milling operations; and conventional or desired power means are employed for moving the spindle saddle vertically on its ways, for feeding the spindle bar axially, and for rotating the bar at different speeds and feeds. In the present case I have shown a machine having power driven mechanisms responsive to controls as follows: hand crank 41 with dial indicator for horizontal movement of the saddle; hand crank 42 with dial indicator for vertical movement of the spindle saddle (this hand crank being similar to 41 but located behind 41 in Fig. 1); hand lever 43 having three positions, for selecting horizontal saddle feed, vertical spindle saddle feed, or neutral; dial control 44 for quick change of platen saddle feeds; hand wheel 45 for axial adjustment of spindle bar, in coaction with micrometer dial 46 for indicating spindle bar movement; hand lever 47 for spindle bar feed and rapid traverse; hand levers 48 for spindle bar feed changes; hand levers 49 for spindle speed changes; push button 51 for spindle jog; push button 52 for spindle run; push button 53 for feed up or right; push button 54 for rapid traverse up or right; push button 55 for feed down or left; push button 56 for rapid traverse down or left; push button 57 for moving work platen in (toward operator); push button 58 for moving work platen out; 59 selector switch for spindle forward and reverse; 61 push button for forward stop; 62 and 63 indicator lights showing selector set for vertical feed and horizontal feed, respectively; and 64 push button in the nature of emergency for stopping all operations. Hand lever 65 is for locking the spindle saddle to the column; and a similar hand operated lock may be employed to lock the platen saddle to the bed, although the feed screw and nut operating between the bed and the platen saddle is of a design to effect locking of the platen saddle to the bed when the feed is at rest, as is known in this art.

Referring now to the selective positioning and locking means for the work platen, best shown in Figs. 5, 6, and 7, it will be observed that I have provided a power driven means for traversing the platen, an adjustable stop adapted for coaction with a cam surface on the platen for positioning the platen and locking it against its ways in a particularly advantageous manner, and a manually operable micrometer control for positioning the stop member, the parts being so constructed and arranged in coaction with the support of the platen and with relation to the cutter spindle that the work piece may be repeatedly removed from a set position and repositioned therein to a degree of precision within one ten-thousandth of an inch. In the illustrative form here shown, the platen is propelled by a screw 66 which threads in a nut member 67 which is rigidly fixed in a platen part 68 at the under side of the platen adjacent to the V ways, the screw being journaled on the platen in a manner to be without endwise play with respect thereto and being engaged with the nut member in such manner as to have no lost motion. A supporting bearing for this purpose is shown somewhat diagrammatically at 69 with provision for endwise take-up and this end of the spindle is driven by reducing gears 71 from a stub shaft 72 mounted in a casing which is fixed to the outer end of the platen. An electric motor 73 drives the shaft 72 through means of a sprocket chain 74 and a spring-loaded friction clutch or slip connection 75 which may be of any suitable or desired construction for transmitting the power traverse torque to the screw 66 and for providing friction slip between the driving and driven members when the platen is brought to final position against the selective stop member above mentioned. The platen 25 carries a fixed abutment face 76, in the nature of a flat inclined surface adapted to have a camming engagement with a complemental face 77 which is mounted on the saddle 23 with capacity for adjustment lengthwise of the screw 82. In the present case, the face 76 is a hardened steel insert 78 which is fixed to the platen portion 68 as by having a rigid press fit therein and the face 77 is formed on a slide block 79 mounted on ways 81 on the saddle 23 for movement lengthwise thereon parallel with the cross travel movement of the platen. A screw 82 threads into the slide block 79 and is suitably journaled on the platen so that by rotation of the screw the block 79 may be moved lengthwise on its ways to position its stop surface 77. The screw 82 may be rotated for its selector positioning function by suitable means, such as shaft connections 83—84, mounted on the platen and arranged so that the shaft 84 extends inwardly along one side of the platen to a control position convenient to the operator. For this control purpose I have provided a hand lever 85 fixed to the inner end of the shaft 84, a micrometer dial 86 also fixed to this shaft and coacting with a fixed zero point, and a pointer 87 fixed to a nut member 88 which threadedly engages a screw thread 89 on the shaft 84. The pointer 87 coacts with an inch scale 91 fixed with respect to the platen. It will be apparent that with this construction the operator may quickly and accurately position the stop block within the range of travel of the platen which, in this particular machine, being a 3" bar horizontal boring machine, is fourteen inches. The adjustment connections are such as to retain the position to which they have been set, but an additional locking means is provided in the form of a screw lock 92, Fig. 7, which may be turned to positively lock the shaft 84 in its set position.

In the preferred embodiment of my invention the motor 73 is carried on the bed saddle as shown in Fig. 1, and this motor is in a circuit controlled by push buttons on the control panel. This control is responsive to the operator who by manipulation of the proper buttons causes the platen to be moved in jogs or runs forward or reverse. These movements of the platen are not for feed purposes but only for withdrawing the work piece from the cutting position to a remote position for measuring the cut, replacement of work piece and cutter, and moving the work piece forwardly to a pre-selected stop position. This control enables the operator to perform the several platen movements with a minimum of time and attention. The platen may thus be returned to the cutting position, stopped, and locked automatically in response to push button control and will repeat continuously to an accuracy of within one ten thousandth of an inch. For simplicity and effectiveness in control the operator stops the motor 73 during the overrun of the motor through the slip clutch following the stopping of the platen by the precision stopping means above described. It will be observed that the camming action of the stop faces 76 and 77 imposes a wedging action which forces the platen to the left (viewing Fig. 6) and firmly seats the platen dovetail into the complemental surfaces on the bed saddle. This combined stopping and locking may be effected at any point within the range of adjustment of the selective positioning means, which in this size machine is 14". This positioning and locking means makes for a high degree of accuracy not only in repositioning the work piece in the identical space relation to the cutter which it previously occupied, but it also functions with the basically rigid bed and column structure and the saddle supporting structures herein disclosed to provide great rigidity in the relation between the work piece and the cutter. It will also be observed that the forces of all the cutting actions tend to seat the saddles into the V of the dovetails, thereby further promoting accuracy in the finished cutting. The spindle bar has the usual tool socket as shown in dotted lines in Fig. 2. Face milling cutters may be attached to the main spindle 24', in a manner well known in this art. This main spindle is preferably mounted for rotation in the saddle 16, as in combined radial and end thrust bearing 93 and radial bearing 94, Fig. 2, and the only axial feed movement is to the bar 12. A motor 95 on the column saddle furnishes the driving power for the spindle and bar movements. In this case the bar has suitable quick feeds from .003" to .030" per revolution, a power rapid traverse in either direction, and a slow hand feed movement for accurate setting. There are suitable quick change spindle speeds from 32 to 800 R. P. M., and the spindle is driven by a direct connected 5 H. P., 1200 R. P. M., constant speed, reversible motor. A feed unit (not shown) in the table bed driven from a separate motor provides rapid traverse and suitable quick change feeds in inches per minute to the horizontal saddle 23 and vertical movement to the spindle saddle 16. The feed screws in the bed and column are provided with backlash elimination, known in this art. In this case the spindle bar has endwise or axial movement of 15" with provision for an additional 5" by resetting. The dimensions, speeds, feeds, etc., herein specified are for the purpose of illustrating the principles of my invention and not for limitation to specific sizes.

It is believed that the invention described in the preface will be readily understood from the foregoing; and while I have shown a particular embodiment, I do not wish to be limited thereto since many modifications may be made, and I therefore contemplate by the appended claims to cover any such modifications as fall within the true spirit and scope of my invention.

I claim:

1. A horizontal boring machine having, in combination, a horizontal bed and a vertical column in rigid fixed relation one with respect to the other, a saddle mounted for vertical movement on the column and having a horizontal cutter spindle bar on an axis crosswise to the length of the bed, a saddle mounted for horizontal movement lengthwise on the bed at right angles to the cutter spindle bar and adapted for horizontal feed thereon, a work platen mounted for horizontal movement on the bed saddle crosswise of the bed and parallel with the spindle bar, mechanism for imparting feed movement to the work platen by travel of the bed saddle lengthwise on the bed while maintaining the work platen locked on the bed saddle, and mechanism including power operated means responsive to manual control to rapidly traverse the work platen in said crosswise travel in and out with respect to the spindle bar and means to automatically lock the work platen to the saddle at a pre-selected stop position in the approach of the work platen to the spindle bar.

2. A horizontal boring machine having, in combination, a horizontal bed and a vertical column in rigid fixed relation one with respect to the other, a saddle mounted for vertical movement on the column and having a horizontal cutter spindle bar adapted for horizontal feed movement, a saddle mounted for horizontal movement lengthwise on the bed at right angles to the cutter spindle bar and adapted for horizontal feed thereon, a work platen mounted for horizontal movement on the bed saddle crosswise of the bed and parallel with the spindle bar, and mechanism responsive to manual control to rapid traverse the work platen in its said movement on the bed saddle toward and from the spindle bar including a screw and nut connection between the bed saddle and the platen and a motor connected to one of said screw and nut members through the intermediary of a friction slip clutch for transmitting said rapid traverse movement to the platen in response to said manual control, an adjustable platen positioning stop member on the bed saddle having an inclined stop surface, and an inclined surface on the platen adapted to have a camming action against the inclined stop surface to accurately stop the platen at a predetermined location determined by the setting of said stop member, said screw and nut drive continuing to be driven through said clutch until the platen movement is stopped by said camming action, the motor drive then over-running through the friction slip clutch.

3. A machine of the character described comprising a horizontal bed and a vertical column in rigid fixed relation one with respect to the other, vertical ways on the front of the column, horizontal top ways on the bed in a plane crosswise of the column ways; a saddle mounted on the column ways for movement vertically thereon and equipped with a horizontal cutter spindle arranged with its axis crosswise of the bed with its cutter end adjacent to the bed, the spindle adapted to be set in cutting position or to have horizontal feed movement axially in the saddle or vertically by feed of the saddle; a saddle mounted on the bed ways for movement lengthwise thereon and having top ways crosswise of the bed ways and parallel with the spindle axis; a work platen mounted on the top ways of the bed saddle for movement on said top ways toward and from the cutter spindle; power means operable in response to manual control in front of the column to rapidly traverse the work platen toward and from the cutter spindle; and means coacting with said power means to automatically lock the platen on its saddle ways at a pre-selected stop position terminating said traverse of the platen toward the spindle.

4. A machine of the character described comprising a horizontal bed and a vertical column in rigid fixed relation one with respect to the other, vertical ways on the front of the column, horizontal top ways on the bed in a plane crosswise of the column ways; a saddle mounted on the column ways for movement vertically thereon and equipped with a horizontal cutter spindle arranged with its axis crosswise of the bed with its cutter end adjacent to the bed, the spindle adapted to be set in cutting position or to have horizontal feed movement axially in the saddle or vertically by feed of the saddle; a saddle mounted on the bed ways for movement lengthwise thereon and having top ways crosswise of the bed ways and parallel with the spindle axis; a work platen mounted on the top ways of the bed saddle for movement on said top ways toward and from the cutter spindle; power means operable in response to manual control in front of the column to rapidly traverse the work platen toward and from the cutter spindle; and means coacting with said power means to automatically lock the platen on its saddle ways at a pre-selected stop position terminating traverse of the platen toward the spindle, including manually operable positioning means having micrometer adjustment in pre-selecting the stop position and having a camming action between a platen member and a bed saddle member to establish a precision stopping point at which the platen is locked.

5. A horizontal boring machine of the character described having, in combination, a horizontal bed and a vertical column in rigid fixed relation one with respect to the other, a saddle mounted on the column ways for movement vertically thereon and equipped with a horizontal cutter spindle bar on an axis crosswise of the bed with its cutter end adjacent to the bed; a saddle mounted on the bed for movement lengthwise thereon; a work platen mounted on the bed saddle for movement crosswise of the bed toward and from the spindle bar; and power means operable in response to manual control in front of the column to rapidly traverse the work platen in said crosswise movement toward and from the spindle bar and to automatically lock the platen on its saddle at a pre-selected stop position terminating said traverse of the platen toward the spindle.

6. A horizontal boring machine as set forth in claim 5, in which the platen is mounted on ways extending crosswise of the bed including V-shaped ways, and in which the power means includes cam members coacting between the bed saddle and the platen arranged to effect said locking of the platen at said stop position in a cam action serving to forcibly clamp the platen V way into the complemental V way on the bed saddle.

7. In a metal working machine, in combination, a cutter, a work platen mounted to slide on ways toward and from the cutter, power means to move the platen on said ways in rapid traverse movements, means to stop the platen at a pre-selected position terminating said traverse of the platen toward the cutter including a stationary but adjustable stop member having an inclined face and a member moving with the platen and having an inclined face adapted to have a camming action against the first-mentioned inclined face by said traverse movement of the platen, said camming action being utilized to effect stopping of the platen and to effect locking of the platen by a wedging action against its ways.

8. The combination set forth in claim 7, in which the power means to move the platen includes a power driven screw held against lengthwise translation, a nut on the screw fixed to the platen, the described member moving with the platen being fixed thereto concentric with said screw, and the described stop member being located adjacent to said screw and adjustable lengthwise thereof, and the described inclined faces being located intermediate said members.

9. The combination set forth in claim 7, including screw and nut members for transmitting said rapid traverse movements, an electric motor carried on the platen and having driving connection to one of said platen moving members through a friction slip clutch, and a push button control for the motor.

10. The combination set forth in claim 7, including a platen support having ways parallel with the ways on which the platen is mounted, the described stop member being slidable on said support ways, one of the platen ways being V-shaped, the support ways and the V-shaped ways being arranged so that said wedging action acts therebetween and causes the platen V-way to be forced into the complemental V-way.

11. A horizontal boring machine having, in combination, a horizontal bed provided with top ways extending the full length of the bed and at one side with a vertical face parallel with the ways and extending from the base to the top thereof, a vertical column seated against said vertical face of the bed and rigidly fixed thereto, the column provided with vertical ways, a saddle mounted for vertical movement on said column ways, a spindle journaled in the saddle on a horizontal axis extending crosswise of the bed, a boring bar journaled in the spindle and having feed movement therein, controls to move the spindle bar and the saddle, a saddle mounted for horizontal movement on the table ways and provided with top ways extending crosswise of the bed, controls for moving the saddle on the bed, a work platen mounted for horizontal movement on the saddle top ways toward and from the spindle bar, power means to move the platen at rapid traverse rate, selective positioning means to accurately stop the platen at a pre-selected point in its movement toward the spindle bar, a control for the power means to traverse the platen, and a friction slip clutch in the drive from the power means to the platen in transmitting said rapid traverse movement toward the spindle bar.

12. A horizontal boring machine having, in combination, a horizontal bed and an upright column in rigid relative relation, a horizontal spindle bar mounted on the column on an axis at 90° with respect to the length of the bed, a saddle slidable lengthwise on the bed, a work platen slidable on the bed saddle in a plane parallel with the spindle axis, the spindle bar being located approximately midway between the ends of the bed, the work platen and the bed saddle being of substantially the same dimension measured lengthwise of the bed and the work platen being movable with respect to the bed saddle only in said plane parallel with the spindle axis whereby to eliminate overhang of the work platen beyond either end of the bed saddle at any working position of the bed saddle with respect to the spindle bar, and mechanism for imparting rapid traverse movement to the work platen while maintaining the bed saddle fixed on the bed and for automatically locking the work platen to the bed saddle at a pre-selected stop position in the approach of the work platen to the spindle bar.

13. A horizontal boring machine having, in combination, a horizontal bed, a vertical column at one side of the bed and rigid with respect thereto, a saddle slidable horizontally on the bed longitudinally thereof, a work platen slidable horizontally on the bed saddle in a plane at 90° to that of the bed saddle travel, a horizontal spindle bar mounted on the vertical column on an axis parallel with said plane of movement of the work platen, mechanism for imparting feed movement to the bed saddle lengthwise of the bed while maintaining the work platen fixed on the bed saddle, mechanism for imparting rapid traverse movement to the work platen in said plane of movement while maintaining the bed saddle fixed on the bed and for automatically locking the work platen to the bed saddle at a pre-selected stop position in the approach of the work platen to the spindle bar, the spindle bar being mounted in such close relationship to the work platen that the spindle bar presents a short extension in its retracted operative position overhanging the work platen.

14. A machine tool having, in combination, a bed provided with horizontal guideways, a saddle mounted on said guideways for movement lengthwise thereon and provided on its top with horizontal guideways extending crosswise to the bed guideways, a work platen mounted for movement lengthwise on the saddle guideways, a horizontal spindle bar supported for operation in a stationary position rigid with relation to the bed and with its axis parallel with the plane of movement of the work platen, mechanism for imparting feed movement to the bed saddle lengthwise on said bed guideways, and mechanism for imparting rapid traverse movement to the work platen lengthwise of the guideways on the bed saddle while maintaining the bed saddle stationary on the bed, including power operated means responsive to manual control to effect said rapid traverse toward and from the spindle bar and to automatically lock the work platen to the bed saddle at a pre-selected stop position in the approach of the work platen to the spindle bar.

15. A machine tool as set forth in claim 14, in which the spindle bar is located approximately midway between the ends of the bed, and in which the overall length of the work platen lengthwise of the bed is approximately the same as that of the bed saddle and the work platen is movable on the bed saddle only on said saddle guideways parallel with the spindle bar, whereby overhang of the work platen with respect to the ends of the bed saddle is eliminated at all working positions of the bed saddle and the work platen.

16. A horizontal boring machine having, in combination, a horizontal bed and a vertical column in rigid, fixed relation one with respect to the other, horizontal guideways on the top of the bed extending substantially the full length thereof, vertical guideways on the column at a face thereof 90° to the length of the bed, a saddle mounted for vertical movement on said column guideways, a horizontal spindle bar on the saddle at 90° to said bed ways and located approximately midway between the ends of the bed, a saddle mounted for horizontal movement on the bed guideways, the bed saddle having guideways on its top at 90° to its guideway mounting on the bed and parallel with the spindle bar, including guideways located at the extreme ends of the saddle, a work platen mounted on said bed saddle guideways and being of approximately the same length as the described length of the bed saddle mounting measured in a direction lengthwise of the bed, the spindle bar and its supporting saddle being mounted in close relationship to the adjacent side of the bed so that the spindle bar presents a short extension which in its retracted operative position overhangs the work platen, feed mechanism for moving the bed saddle lengthwise on the bed whereby at all positions of the bed saddle on the bed there is no overhang of the work platen with respect to the bed saddle, and mechanism for imparting rapid traverse to the work platen for retraction of the work and for repositioning the work with respect to the spindle bar, whereby extremely accurate re-positioning of the work with respect to the spindle bar is obtained due to the rigid relative relation of the parts, the avoidance of overhang, and the relatively short extension of the spindle bar.

17. A horizontal boring machine having, in combination, a horizontal bed having guideways on its top extending substantially from end to end thereof, a vertical column at one side of the bed adjacent to one end thereof mounted in rigid, fixed relation to the bed and having guideways extending substantially from the top of the bed to the top of the column at a face thereof 90° to the length of the bed, a saddle mounted for vertical movement on said column guideways, a horizontal spindle bar on the saddle at 90° to said bed guideways and located approximately midway between the ends of the bed, a saddle mounted for horizontal movement on the bed guideways, the bed saddle having guideways on its top at 90° to its guideway mounting on the bed and parallel with the spindle bar, including guideways located at the extreme ends of the saddle, a work platen mounted on said bed saddle guideways with its major length parallel with the bed guideways, the work platen and the bed saddle being of substantially the same dimension measured lengthwise of the bed and the work platen being movable with respect to the bed saddle only parallel with the spindle bar whereby at all operating positions of the platen on the bed saddle there is no overhang of the platen at the ends of the bed saddle, the spindle bar and its supporting saddle being mounted in close relationship to the adjacent side of the bed so that the spindle bar in its retracted operative position overhangs the work platen.

18. A horizontal boring machine having, in combination, a horizontal bed having guideways on its top extending substantially from end to end thereof, a vertical column at one side of the bed adjacent to one end thereof mounted in rigid, fixed relation to the bed and having guideways extending substantially from the top of the bed to the top of the column, a saddle mounted for vertical movement on said column guideways, a horizontal spindle bar on the saddle at 90° to the bed guideways and located medially between the ends of the bed, a saddle mounted for horizontal movement lengthwise on the bed guideways, guideways on top of the bed saddle parallel with the spindle bar, a work platen mounted on said bed saddle guideways with its major length parallel with the bed guideways, the work platen and the bed saddle being of substantially the same dimension measured lengthwise of the bed and the work platen being movable with respect to the bed saddle only parallel with the spindle bar whereby at all operating positions of the platen on the bed saddle there is no overhang of the platen at the ends of the bed saddle.

19. A horizontal boring machine as set forth in claim 18, in which the spindle bar and its supporting saddle are mounted in close relationship to the adjacent side of the bed so that the spindle bar in its retracted operative position overhangs the work platen.

CHARLES B. DE VLIEG.